United States Patent
Yoo

(10) Patent No.: US 11,832,561 B2
(45) Date of Patent: Dec. 5, 2023

(54) PLANT CULTIVATING APPARATUS

(71) Applicant: LG ELECTRONICS INC., Seoul (KR)

(72) Inventor: Imsung Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 228 days.

(21) Appl. No.: 17/121,106

(22) Filed: Dec. 14, 2020

(65) Prior Publication Data

US 2021/0185948 A1 Jun. 24, 2021

(30) Foreign Application Priority Data

Dec. 24, 2019 (KR) .................. 10-2019-0174308

(51) Int. Cl.
*A01G 27/00* (2006.01)
*A01G 27/06* (2006.01)
*A01G 9/04* (2006.01)

(52) U.S. Cl.
CPC .......... *A01G 27/003* (2013.01); *A01G 9/045* (2013.01); *A01G 27/008* (2013.01); *A01G 27/06* (2013.01)

(58) Field of Classification Search
CPC ........ A01G 9/045; A01G 27/06; A01G 31/02; A01G 31/06; A01G 27/003; A01G 27/005; A01G 27/008; A01G 7/045
See application file for complete search history.

(56) References Cited

U.S. PATENT DOCUMENTS

| 8,234,812 B1 * | 8/2012 | Colless | A01G 31/06 |
| | | | 47/61 |
| 9,476,752 B2 * | 10/2016 | Vilag | B67D 7/3272 |
| 2005/0198898 A1 * | 9/2005 | Vogt | A01G 27/06 |
| | | | 47/65.6 |
| 2011/0016910 A1 * | 1/2011 | Bak | F25D 23/02 |
| | | | 62/449 |

(Continued)

FOREIGN PATENT DOCUMENTS

| CN | 103416292 A | * 12/2013 | ............. A01G 31/06 |
| CN | 103747668 A | * 4/2014 | ........... A01G 27/003 |
| CN | 103416292 | 7/2015 | |

(Continued)

OTHER PUBLICATIONS

Extended European Search Report in European Appln. No. 20213413. 6, dated Sep. 24, 2021, 9 pages.

(Continued)

*Primary Examiner* — Peter M Poon
*Assistant Examiner* — Carly W. Lynch
(74) *Attorney, Agent, or Firm* — Fish & Richardson P.C.

(57) ABSTRACT

A plant cultivating apparatus according to an embodiment of the present disclosure includes a main body, a shelf, a cultivation bed, and a cultivation container. The shelf is disposed in the cultivation space formed in the main body, the cultivation bed is disposed on the shelf, and the cultivation container is seated in the cultivation bed. The cultivation bed includes a water supply part for receiving a predetermined amount of water. In addition, the shelf includes a water level sensor. The water level sensor is positioned vertically below the water supply part to measure an amount of water stored in the water supply part.

19 Claims, 9 Drawing Sheets

(56) References Cited

U.S. PATENT DOCUMENTS

2020/0128761 A1\* 4/2020 Kincaid .................. A01G 9/24

FOREIGN PATENT DOCUMENTS

| CN | 204560508 | | 8/2015 | |
|---|---|---|---|---|
| CN | 107980593 | | 5/2018 | |
| KR | 100807247 | B1 \* | 2/2008 | ............. A47J 27/04 |
| KR | 101398608 | B1 \* | 5/2014 | ............... F25C 1/08 |
| KR | 101422636 | | 7/2014 | |
| KR | 20150004183 | U \* | 11/2015 | ............. A01G 31/02 |
| KR | 20180080056 | A \* | 7/2018 | ............. F25D 11/00 |
| KR | 1020190132790 | | 11/2019 | |
| WO | WO2021080140 | | 4/2021 | |

OTHER PUBLICATIONS

Office Action in European Appln. No. 20213413.6, dated Sep. 8, 2022, 4 pages.

\* cited by examiner

PLANT CULTIVATING APPARATUS

CROSS-REFERENCE TO RELATED APPLICATION

The present application claims benefit of priority to Korean Patent Application No. 10-2019-0174308, entitled "PLANT CULTIVATING APPARATUS" filed on Dec. 24, 2019, in the Korean Intellectual Property Office, the entirety of which is incorporated by reference herein.

TECHNICAL FIELD

The present disclosure relates to a plant cultivating apparatus, and more particularly, to a plant cultivating apparatus for controlling water supply by detecting an amount of water stored in a water supply part.

BACKGROUND

In cities, buildings are very dense. Accordingly, there are not enough places to cultivate plants in cities.

In addition, in cities, apartment-type residential culture has been established, and thus the number of houses with yards or vegetable gardens is very small.

On the other hand, due to problems of fine dust or environmental pollution, interest in cultivating plants used as food materials at home has been increasing in recent years.

Accordingly, even in houses that do not have yards or vegetable gardens, there is an increasing demand for pots or apparatuses capable of cultivating plants in residential spaces.

Pots are not suitable for cultivating plants that are sensitive to temperature or humidity.

Plant cultivating apparatuses may set environmental factors such as temperature or humidity required for a specific plant. Accordingly, when a plant cultivating apparatus is used, it becomes possible to germinate and cultivate desired plants, even indoors.

In regard to a plant cultivating apparatus, Korean Patent Application Publication No. 10-2019-0132790 (hereinafter referred to as 'Related Art') discloses 'a plant cultivating apparatus'. Related Art discloses forming a space for cultivating plants inside, and supplying the plants with water and nutrients necessary for their cultivation. However, proper temperature and humidity must be maintained in order to cultivate the plants well. In addition, an adequate amount of water should be supplied to the plants at suitable times. However, Related Art does not disclose a configuration for separately measuring or controlling the amount of water supplied to the plants.

Supplying plants with the adequate amount of water is important in order to cultivate the plants. In addition, supplying the plants with the adequate amount of water at suitable times is necessary in order to cultivate the plants well. Therefore, there is a need for improvement in the related technology.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY

The present disclosure is directed to addressing a disadvantage in the art in which it is difficult to accurately measure an amount of water supplied to a plant cultivating apparatus.

The present disclosure is further directed to addressing a disadvantage in the art in which since water needed to cultivate plants is intermittently supplied to a water supply part, too much or too little water is supplied to the water supply part.

The present disclosure is still further directed to addressing a disadvantage in the art in which since a contact type sensor is used to measure the supplied amount of water, the internal configuration of the plant cultivating apparatus becomes complex and its design becomes difficult.

The present disclosure is not limited to what has been disclosed hereinabove. A person skilled in the art may clearly understand, from the following description, other aspects not mentioned above.

Particular implementations of the present disclosure provide a plant cultivating apparatus that includes a main body, a shelf, a cultivation bed, and a cultivation container. The main body may define a cultivation space and include a door configured to open or close the cultivation space. The shelf may be disposed in the cultivation space and include a water level sensor. The cultivation bed may be disposed on the shelf, define a receiving space, and include a water supply part that is recessed from a bottom surface of the cultivation bed and configured to store water. The cultivation container may be disposed above the water supply part of the cultivation bed. The water supply part of the cultivation bed may be positioned above the water level sensor of the shelf. The water level sensor may be configured to measure an amount of the water stored in the water supply part of the cultivation bed.

In some implementations, the plant cultivating apparatus can optionally include one or more of the following features. A bottom surface of the water supply part and the water level sensor may be spaced apart from each other. The plant cultivating apparatus may include an elastic member that is disposed between the water level sensor and the shelf and supports the water level sensor on the shelf. The elastic member may be configured to bias the water level sensor against the shelf such that, based on the bottom surface of the water supply part of the cultivation bed coming into contact with the water level sensor, the water level sensor is lowered toward the shelf. The bottom surface of the water supply part may include an inclined surface. The bottom surface of the water supply part may include a pressurizing protrusion that protrudes downward. The amount of the water stored in the water supply part may be measured based on a change in capacitance of the water level sensor. The cultivation bed may include an inlet and a water supply passage. The inlet may be disposed on the cultivation bed and positioned higher than the water supply part. The inlet may be configured to introduce water to the water supply part. The water supply passage may fluidly connect the inlet to the water supply part. The cultivation container may define an opening that is configured to introduce the water stored in the water supply part into the cultivation container. The cultivation container may include a wick that includes a porous material configured to absorb water. A lower end of the wick may be adjacent to the opening of the cultivation container. The wick may extend upward such that an upper end of the wick is disposed inside the cultivation container. The main body may include a controller configured to control at least one of temperature, humidity, or an amount of light in the cultivation space. The plant cultivating apparatus may include a rail configured to couple the cultivation bed to the shelf. The cultivation bed may be configured to slide on the shelf along the rail.

Particular implementations of the present disclosure provide a plant cultivating apparatus that includes a main body, a shelf, a cultivation bed, and a cultivation container. The main body may define a cultivation space and include a door configured to open or close the cultivation space. The shelf may be disposed in the cultivation space and include a water level sensor. The cultivation bed may be disposed on the shelf, define a receiving space, and include a water supply part that is recessed from a bottom surface of the cultivation bed and configured to store water. The cultivation container may be disposed above the water supply part of the cultivation bed. The water level sensor may be configured to measure an amount of the water stored in the water supply part of the cultivation bed. The cultivation container may be configured to, based on the amount of the water measured by the water level sensor being smaller than a predetermined value, allow water to be supplied to the water supply part of the cultivation bed.

In some implementations, the plant cultivating apparatus can optionally include one or more of the following features. The water level sensor may be configured to operate based on the cultivation bed being disposed on the shelf. A bottom surface of the water supply part and the water level sensor may be spaced apart from each other. The plant cultivating apparatus may include an elastic member that is disposed between the water level sensor and the shelf and supports the water level sensor on the shelf. The elastic member may be configured to bias the water level sensor against the shelf such that, based on the bottom surface of the water supply part of the cultivation bed coming into contact with the water level sensor, the water level sensor is lowered toward the shelf. The bottom surface of the water supply part may include an inclined surface. The bottom surface of the water supply part may include a pressurizing protrusion that protrudes downward. The amount of the water stored in the water supply part may be measured based on a change in capacitance of the water level sensor. The cultivation bed may include an inlet and a water supply passage. The inlet may be disposed on the cultivation bed and positioned higher than the water supply part. The inlet may be configured to introduce water to the water supply part. The water supply passage may fluidly connect the inlet to the water supply part. The cultivation container may define an opening that is configured to introduce the water stored in the water supply part into the cultivation container.

A plant cultivating apparatus according to an embodiment of the present disclosure includes a main body, a shelf, a cultivation bed, and a cultivation container. The shelf is disposed in a cultivation space formed in the main body, the cultivation bed is disposed on the shelf, and the cultivation container is seated in the cultivation bed.

The cultivation bed includes a water supply part for storing a predetermined amount of water. In addition, the shelf includes a water level sensor, and the water level sensor is positioned vertically below the water supply part to measure an amount of water stored in the water supply part.

In the plant cultivating apparatus according to an embodiment of the present disclosure, a bottom surface of the water supply part and the water level sensor are spaced apart from each other by a predetermined distance.

In the plant cultivating apparatus according to an embodiment of the present disclosure, the water level sensor is supported by an elastic member on the shelf, and in response to the bottom surface of the water supply part coming into contact with the water level sensor, the water level sensor is lowered to the shelf.

In the plant cultivating apparatus according to an embodiment of the present disclosure, the bottom surface of the water supply part is formed to be inclined in one direction.

In the plant cultivating apparatus according to an embodiment of the present disclosure, the bottom surface of the water supply part includes a pressurizing protrusion that protrudes downward.

In the plant cultivating apparatus according to an embodiment of the present disclosure, the amount of water stored in the water supply part is measured based on a change in capacitance of the water level sensor.

In the plant cultivating apparatus according to an embodiment of the present disclosure, the cultivation bed includes an inlet disposed on one side of the cultivation bed at a position higher than the water supply part, the inlet serving as an entrance into which water is introduced, and a water supply passage serving as a passage for coupling the inlet to the water supply part.

In the plant cultivating apparatus according to an embodiment of the present disclosure, the cultivation container includes an opening, wherein a bottom surface of the opening is opened to allow water stored in the water supply part to be introduced into the cultivation container.

In the plant cultivating apparatus according to an embodiment of the present disclosure, the cultivation container includes a wick made of a porous material so as to absorb water, wherein a lower end of the wick is disposed adjacent to the opening, and an upper end of the wick is disposed to face upward inside the cultivation container.

In the plant cultivating apparatus according to an embodiment of the present disclosure, the main body includes a controller configured to control at least one of temperature, humidity, or an amount of light in the cultivation space.

In the plant cultivating apparatus according to an embodiment of the present disclosure, the cultivation bed and the shelf are coupled to each other through a rail, wherein the cultivation bed is configured to slide in one direction on the shelf through the rail.

A plant cultivating apparatus according to another embodiment of the present disclosure includes a main body, a shelf, a cultivation bed, and a cultivation container. The main body has a cultivation space formed therein, and is configured to open or close the cultivation space using a door coupled to at least one side of the main body. The shelf is disposed horizontally in the cultivation space, and includes a water level sensor. The cultivation bed is disposed on the shelf, wherein the cultivation bed is a container having an open top, has a receiving space formed therein, and includes, on a bottom surface thereof, a water supply part for storing water. The cultivation container is disposed above the water supply part of the cultivation bed.

In addition, the water level sensor is configured to measure an amount of water stored in the water supply part, and in response to the amount of water measured by the water level sensor being smaller than a predetermined value, to allow water to be supplied to the water supply part.

In the plant cultivating apparatus according to an embodiment of the present disclosure, the water level sensor operates while the cultivation bed is disposed on the shelf.

According to the embodiments of the present disclosure, the amount of water supplied to the plants can be accurately measured in real time.

According to the embodiments of the present disclosure, since water needed to cultivate the plants can be supplied to the water supply part in real time based on the measured amount of water, it is possible to constantly supply the plants with an adequate amount of water.

According to the embodiments of the present disclosure, since a non-contact type sensor can be included in the plant cultivating apparatus to measure the supplied amount of water, it is possible to simplify the internal configuration of the plant cultivating apparatus and to facilitate simpler design thereof.

According to the embodiments of the present disclosure, since the distance between the non-contact type sensor and the space for storing water can be kept constant, it is possible to reliably measure the supplied amount of water.

The effects of the present disclose are not limited to those mentioned above, and other effects not mentioned can be clearly understood by those skilled in the art from the following description.

DETAILED DESCRIPTION

Figure 1:
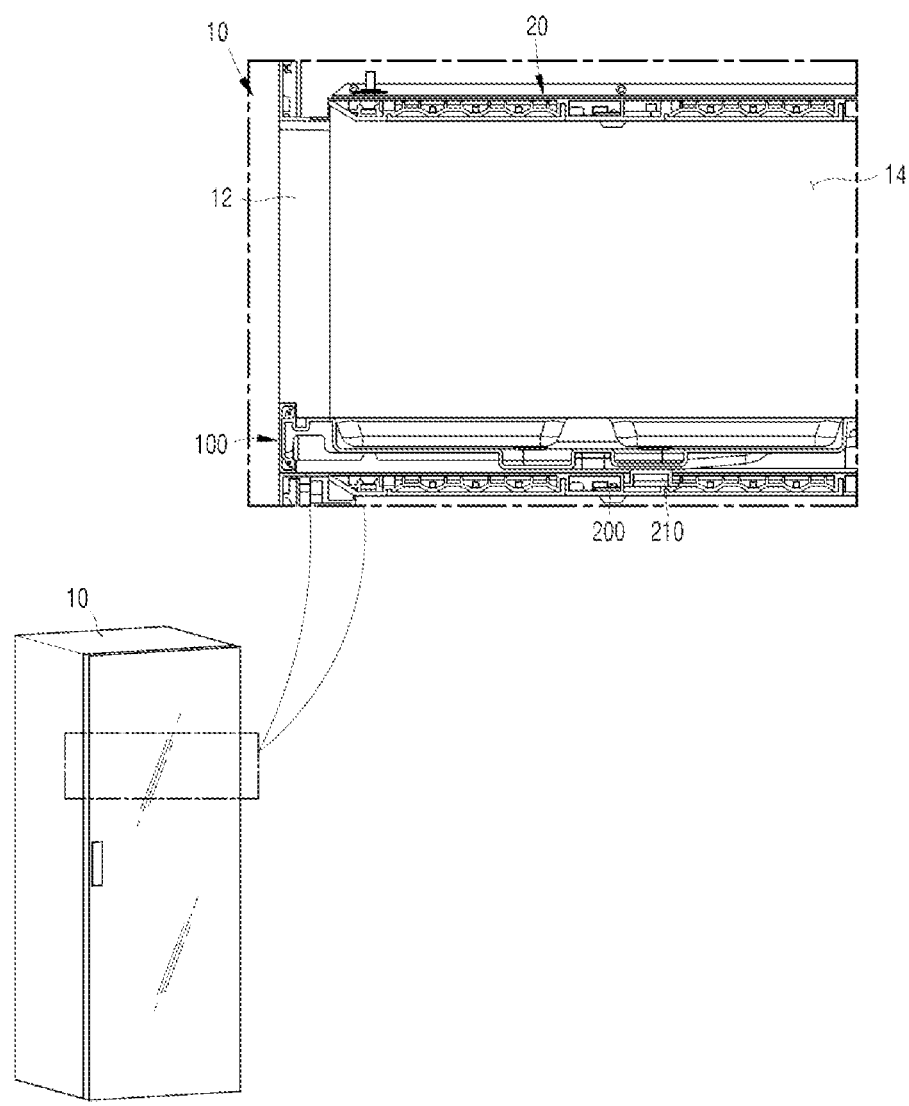
FIG. 1 is a perspective view and a partial cross-sectional view illustrating a plant cultivating apparatus according to an embodiment of the present disclosure.

Hereinafter, the embodiments of the present disclosure as described above will be described in detail with reference to the accompanying drawings. The same reference numerals refer to the same components throughout the detailed description.

FIG. 1 is a perspective view and a partial cross-sectional view illustrating a plant cultivating apparatus according to an embodiment of the present disclosure.

As illustrated in FIG. 1, the plant cultivating apparatus according to an embodiment of the present disclosure includes a main body 10, a shelf 200, and a cultivation bed 100.

The cultivation bed 100 includes a cultivation container 110 and a tray 130.

The cultivation container 110 contains a medium. The medium is provided to allow plant seeds to be planted and allow plants to take root. The medium may be soil containing nutrients that aid in the growth or development of the plants. Alternatively, the medium may be made of a material similar to soil.

The main body 10 has a predetermined space formed therein. The predetermined space is a cultivation space 14, which may accommodate the plants and establish an environment for growing the plants. The main body 10 may have various sizes and shapes.

In an embodiment of the present disclosure, as illustrated in FIG. 1, the main body 10 may be formed in a rectangular parallelepiped shape and have the cultivation space 14 formed therein, and at least one of the surfaces forming the cultivation space 14 may be open. A door 12 may be coupled to the open surface of the cultivation space 14, and the cultivation space 14 may be opened or closed through the door 12.

At least a portion of the door 12 may be made of a transparent material. Accordingly, a user may observe the cultivation space 14 through the transparent portion of the door 12.

The door 12 may be provided with a locking device. The locking device of the door 12 may be set to open when the state of the cultivation space 14 meets a predetermined condition. This is to prevent a situation in which the door 12 is opened due to the user's carelessness during germination, which is an important period for the growth of the plants, and the seeds thus cannot germinate. This is merely for illustrative purposes, and according to the embodiment to which the present disclosure is applied, the main body 10 and the door 12 may be implemented in various shapes, forms, and materials.

The main body 10 may be provided with a ventilation device for ventilation therein. The ventilation is achieved by discharging air in the cultivation space 14 to the outside or introducing outside air into the cultivation space 14.

The shelf 200 is disposed in the cultivation space 14. A plurality of shelves 200 may be disposed in the cultivation space 14. The shelf 200 is a structure that crosses the cultivation space 14 horizontally. The cultivation bed 100 is disposed on the shelf 200. The shelf 200 supports a load of the cultivation bed 100.

The plurality of shelves 200 may be vertically disposed in the cultivation space 14. In addition, at least one cultivation bed 100 may be seated on each shelf 200.

A controller 20 may be provided above the shelf 200. The controller 20 may be disposed at the upper portion of the cultivation space 14, and may include at least one of a steam injector, a heater, or a light irradiator. Accordingly, the controller 2 allows the steam injector, the heater, or the light irradiator to inject steam, emit heat, or irradiate light downward, respectively.

The controller 20 controls temperature, humidity, and an amount of light in the cultivation space 14. Accordingly, the cultivation space 14 in the main body 10 may be provided with a measuring means capable of measuring the temperature, the humidity, and the amount of light in the cultivation space 14. The controller 20 operates based on the temperature, the humidity, and the amount of light in the cultivation space 14, which are measured by the measuring means, and accordingly, the temperature, the humidity, and the amount of light in the cultivation space 14 can be maintained at predetermined values.

Figure 2:
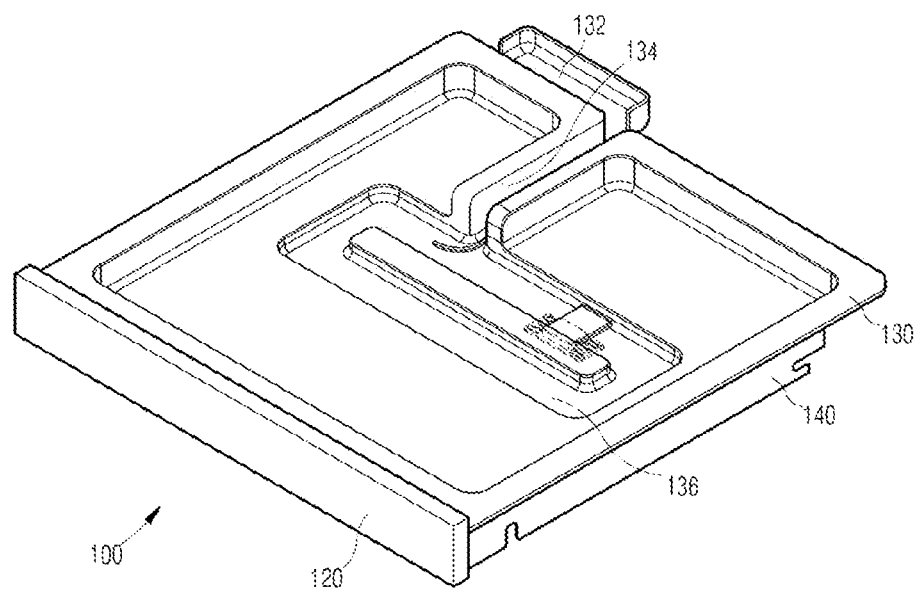
FIG. 2 is a perspective view illustrating a cultivation bed in a plant cultivating apparatus according to an embodiment of the present disclosure.
Figure 3:
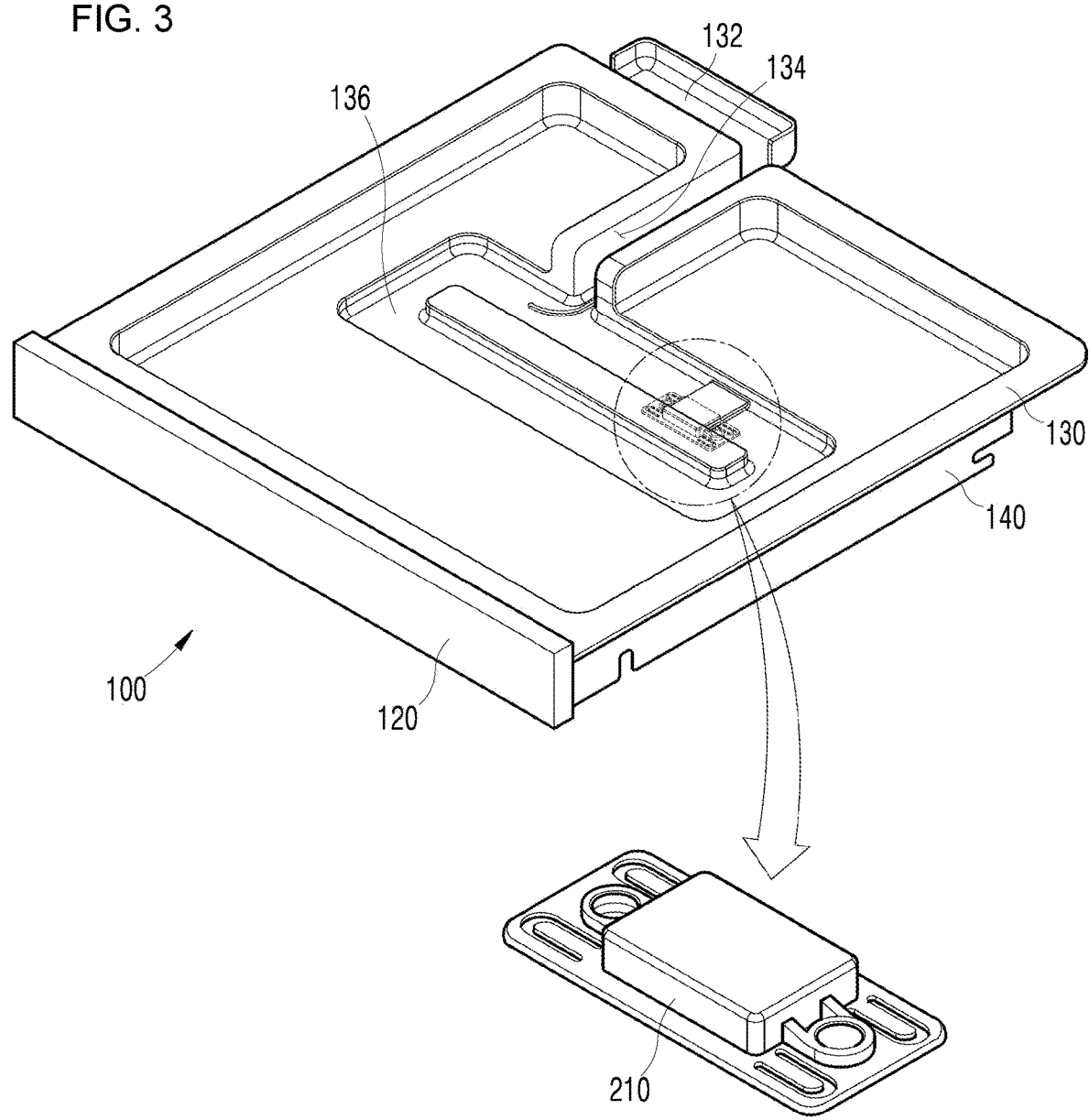
FIG. 3 is a perspective view illustrating a cultivation bed and a sensor in a plant cultivating apparatus according to an embodiment of the present disclosure.

FIG. 2 is a perspective view illustrating a cultivation bed 100 in the plant cultivating apparatus according to an embodiment of the present disclosure, and FIG. 3 is a perspective view illustrating the cultivation bed 100 and a sensor in the plant cultivating apparatus according to an embodiment of the present disclosure.

As illustrated in FIGS. 2 and 3, the cultivation bed 100 includes a cultivation container 110, a handle 120, and a tray 130. As described above, the cultivation container 110 is a container that has a wide bottom surface and an open top.

The cultivation container 110 contains a medium. Seeds are planted in the medium. The medium may be in various forms, and different types of medium may be stacked and contained in the cultivation container 110.

The cultivation container 110 is received in the tray 130. In addition, an opening may be formed in at least a portion of the bottom surface of the cultivation container 110.

The opening is disposed at the upper portion of the water supply part 136, and serves as a passage through which water in the water supply part 136 is introduced into the cultivation container 110. A wick is provided in the cultivation container 110. The lower end of the wick is disposed adjacent to the opening, and the upper end of the wick faces the inside of the cultivation container 110. The wick is made of a porous material so as to have the property of absorbing water well. Accordingly, water introduced into the opening may be evenly supplied to the medium in the cultivation container 110 through the wick.

The tray 130 provides a space for seating the cultivation container 110. The tray 130 may be in the form of a drawer. One side of the tray 130 is provided with a handle 120, and the handle 120 has a shape that may be gripped by a user.

In addition, the tray 130 is provided with the water supply part 136. The water supply part 136 may be provided in at least a portion of the tray 130, and may be in the form of a groove so as to store water. The water supply part 136 may form a predetermined path, and the cultivation container 110 is seated above the water supply part 136. An inlet 132 is disposed on one side of the tray 130 at a position higher than the water supply part 136. The inlet 132 is a place where water is supplied, protrudes from one side of the tray 130, and when water is introduced into the upper portion thereof, allows water to flow into a water supply passage 134. The water supply passage 134 serves as a passage for coupling the inlet 132 to the water supply part 136. Since the inlet 132 is disposed at a higher position than the water supply part 136, water supplied to the inlet 132 flows into the water supply part 136 along the water supply passage 134.

In addition, by sliding in one direction on the shelf 200, the cultivation bed 100 may be inserted into the cultivation space 14 or may be pulled out from the cultivation space 14. At least one rail 140 may be mounted at a lower portion of the cultivation bed 100, and the rail 140 may interact with the shelf 200 in such a manner as to allow the cultivation bed 100 to slidingly move in one direction.

In addition, the shelf 200 described below includes a water level sensor 210. The water level sensor 210 is positioned vertically below the water supply part 136 while the cultivation bed 100 is seated on the shelf 200. The water level sensor 210 is a non-contact type sensor, and measures the level of water stored in the water supply part 136.

Figure 4:
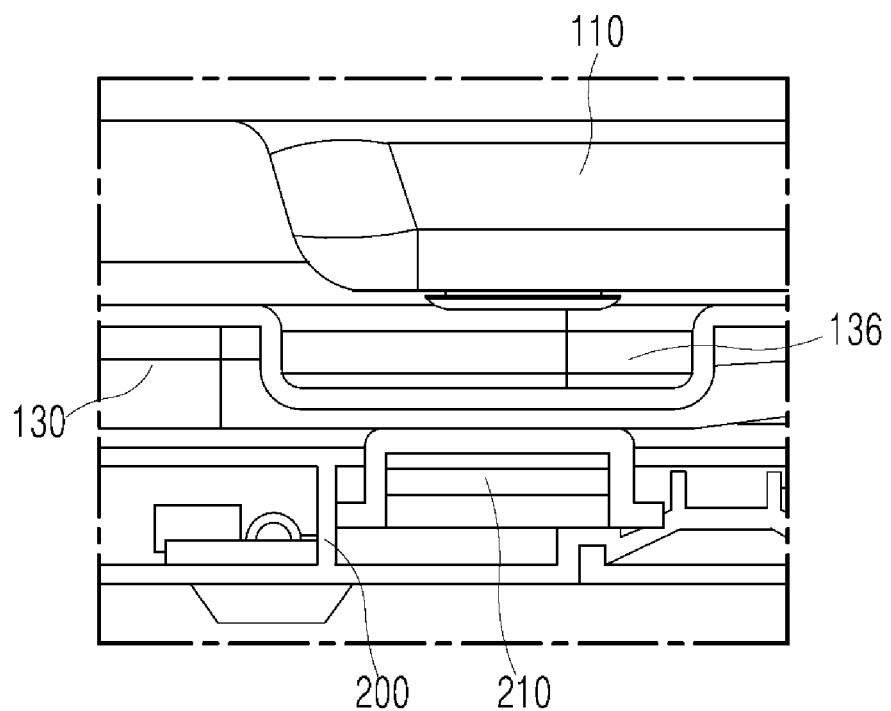
FIG. 4 is a partial cross-sectional view illustrating an arrangement relationship between a water supply part and a sensor in a plant cultivating apparatus according to an embodiment of the present disclosure.
Figure 5:
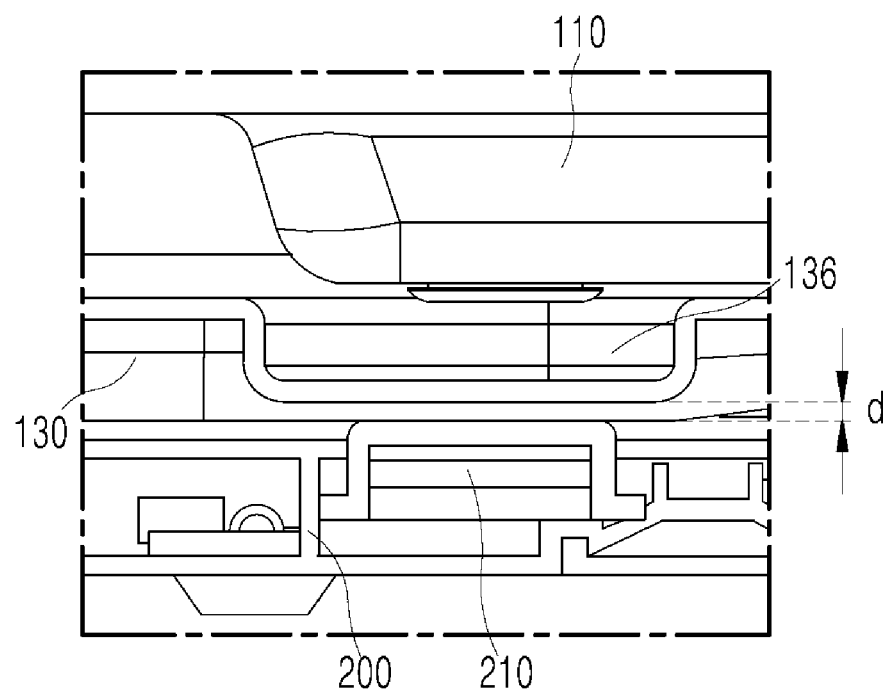
FIG. 5 is a partial cross-sectional view illustrating a distance between a water supply part and a sensor in a plant cultivating apparatus according to an embodiment of the present disclosure.

FIG. 4 is a partial cross-sectional view illustrating an arrangement relationship between the water supply part 136 and the sensor in the plant cultivating apparatus according to an embodiment of the present disclosure, and FIG. 5 is a partial cross-sectional view illustrating a distance between the water supply part 136 and the sensor in the plant cultivating apparatus according to an embodiment of the present disclosure.

As illustrated in FIGS. 4 and 5, the water level sensor 210 is disposed vertically below the water supply part 136 while the cultivation bed 100 is seated on the shelf 200. The water level sensor 210 may be formed as a sensor having a variable capacitance. The amount of water stored in the water supply part 136 is measured based on a change in capacitance of the water level sensor 210. The water level sensor 210 is spaced apart by a predetermined distance d from the bottom surface of the water supply part 136, which is the bottom surface of the cultivation bed 100, so that it does not contact or interfere with the bottom surface of the cultivation bed 100 in the process of slidingly seating the cultivation bed 100 on the shelf 200.

Figure 6:
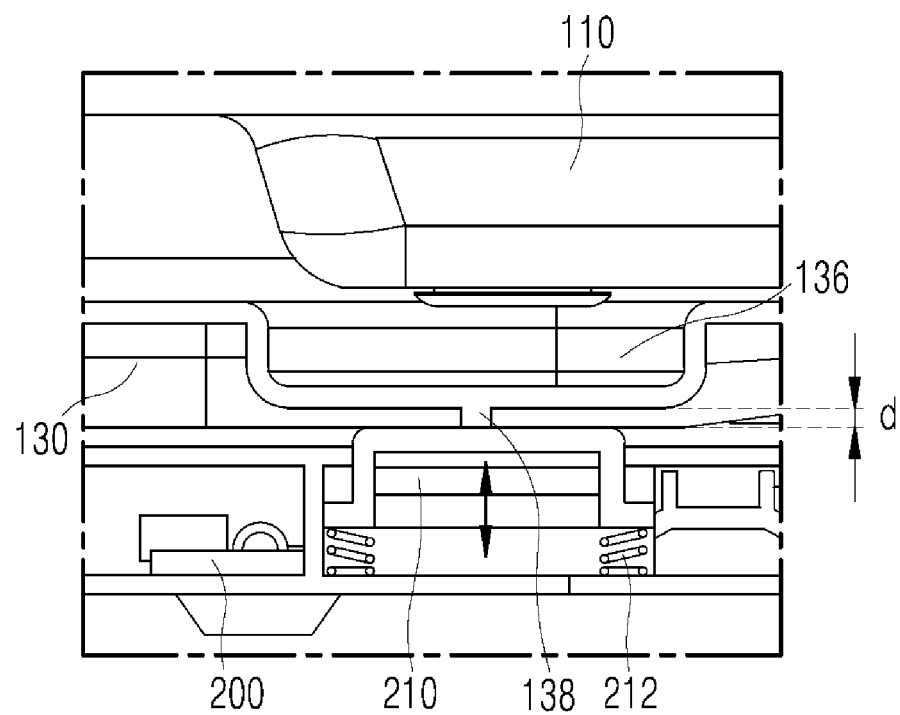
FIG. 6 is a partial cross-sectional view illustrating a state in which a pressurizing protrusion is formed on a bottom surface of a water supply part in a plant cultivating apparatus according to an embodiment of the present disclosure.

FIG. 6 is a partial cross-sectional view illustrating a state in which a pressurizing protrusion 138 is formed on a bottom surface of the water supply part 136 in the plant cultivating apparatus according to an embodiment of the present disclosure.

As illustrated in FIG. 6, a pressurizing protrusion 138 protruding downward may be formed on the bottom surface of the water supply part 136. At this time, the water level sensor 210 is provided on the shelf 200, and at least a portion of the water level sensor 210 protrudes above the shelf.

Specifically, the water level sensor 210 includes an elastic member 212. When the force pressing the water level sensor 210 vertically acts thereon, the water level sensor 210 is lowered to press the elastic member 212, and when the force pressing the water level sensor 210 is removed, the water level sensor 210 rises to its original position by means of the elastic force of the elastic member 212.

Accordingly, the pressurizing protrusion 138 formed on the bottom surface of the water supply part 136 presses the water level sensor 210 vertically, and allows the water level sensor 210 to be spaced apart from the bottom surface of the water supply part 136 by a predetermined distance d.

Figure 7:
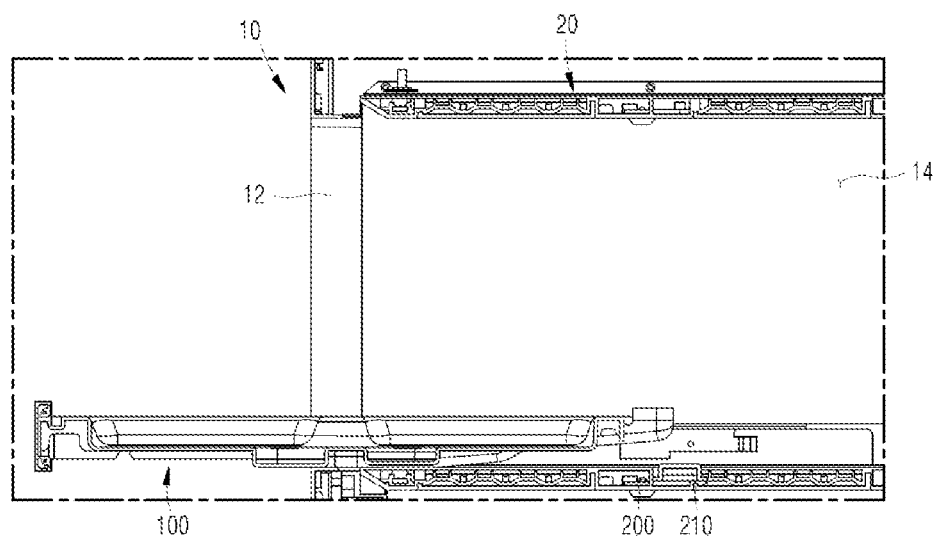
FIG. 7 is a cross-sectional view illustrating a state in which a cultivation bed is pulled out from a shelf in a plant cultivating apparatus according to an embodiment of the present disclosure.
Figure 8:
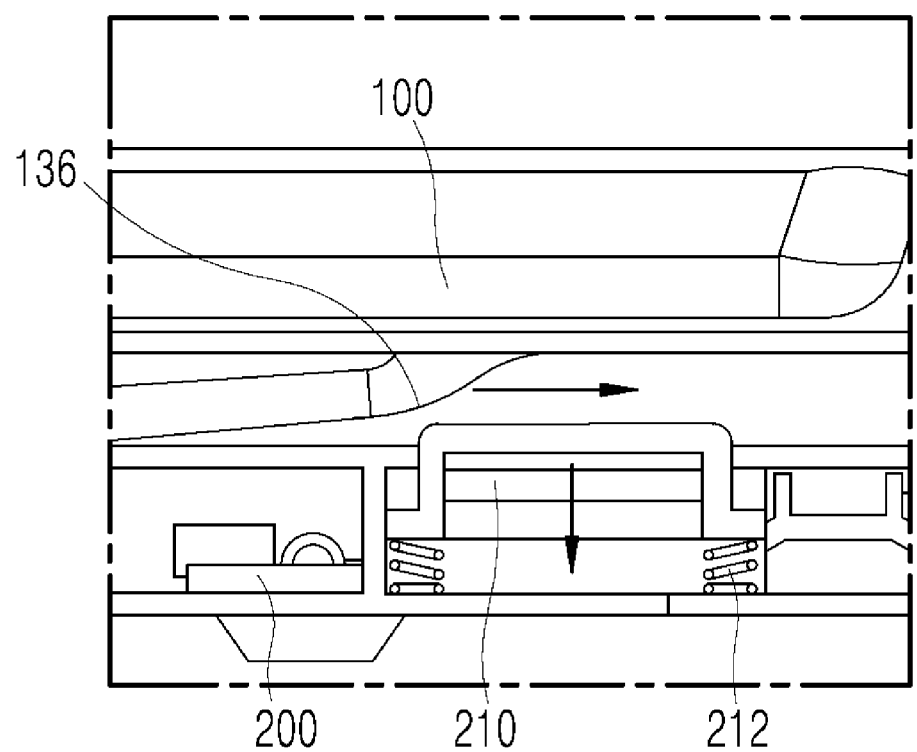
FIG. 8 is a partial cross-sectional view illustrating a state in which a cultivation bed is slidingly seated on a shelf in a plant cultivating apparatus according to an embodiment of the present disclosure.

FIG. 7 is a cross-sectional view illustrating a state in which the cultivation bed 100 is pulled out from the shelf 200 in the plant cultivating apparatus according to an embodiment of the present disclosure, and FIG. 8 is a partial cross-sectional view illustrating a state in which the cultivation bed 100 is slidingly seated on the shelf 200 in the plant cultivating apparatus according to an embodiment of the present disclosure.

As illustrated in FIG. 8, the bottom surface of the water supply part 136 may be formed to be inclined in one direction. Accordingly, when the cultivation bed 100 slides on the shelf 200 in one direction, the inclined bottom surface of the water supply part 136 gradually presses the water level sensor 210, and the water level sensor 210 is pushed downward by contacting the inclined bottom surface of the water supply part 136.

As a result, in the process of the cultivation bed 100 being mounted on the shelf 200, the water level sensor 210 does not interfere with the path of the cultivation bed 100, and the water level sensor 210 may maintain a predetermined distance from the water supply part 136.

Figure 9:
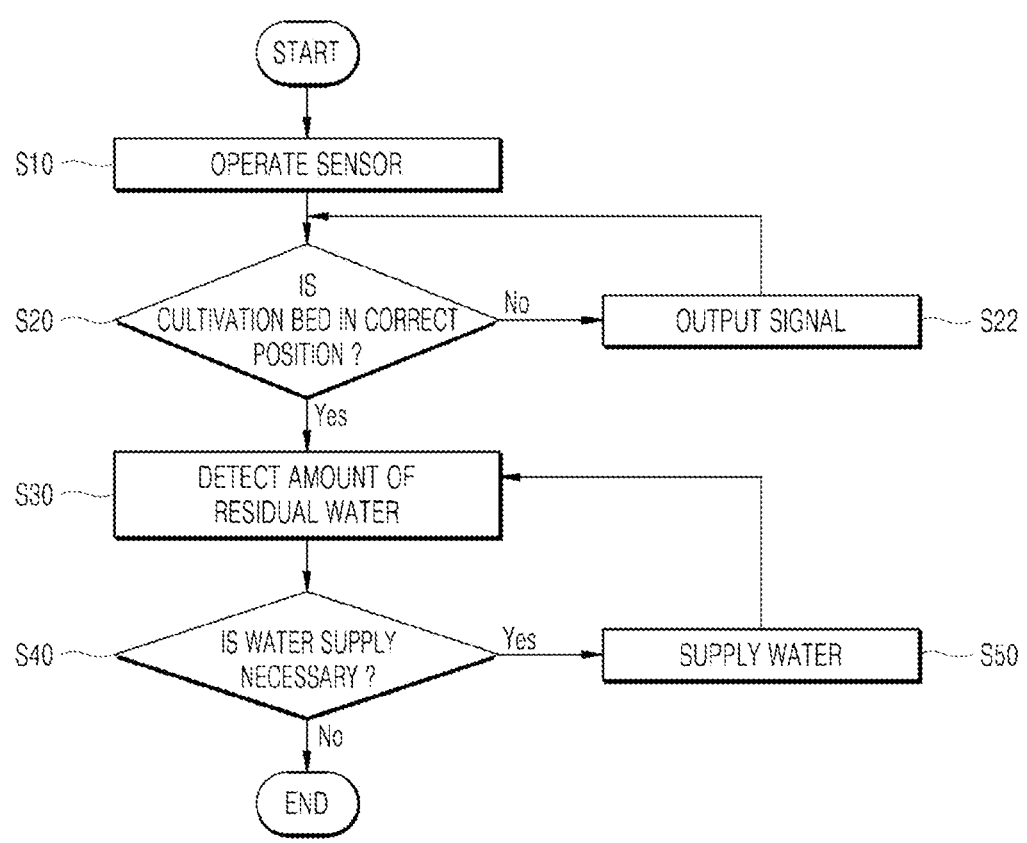
FIG. 9 is a flowchart illustrating a process of measuring residual water and supplying water in a plant cultivating apparatus according to an embodiment of the present disclosure.

FIG. 9 is a flowchart illustrating a process of measuring residual water and supplying water in a plant cultivating apparatus according to an embodiment of the present disclosure.

As illustrated in FIG. 9, at S10, the plant cultivating apparatus according to an embodiment of the present disclosure operates the sensor to measure the amount of water stored in the water supply part 136 in real time. After S10, at S20, the sensor first detects whether the cultivation bed 100 is in the correct position. When the cultivation bed 100 is not in the correct position, at S22, the sensor notifies the user through a signal output that the cultivation bed 100 is not correctly mounted. However, when the cultivation bed 100 is in the correct position, at S30, the sensor detects an amount of residual water. At S40, it is determined whether water needs to be supplied, based on the detection of the amount of residual water. According to the determination, at S50, water supply is made, or at S30, the amount of residual water is continuously detected.

In the above, the embodiments of the present disclosure have been described with reference to the accompanying drawings, but these are exemplary. Therefore, the present disclosure should not be limited to the embodiments and drawings as described above. It would be obvious to those skilled in the art that various other changes and modifications can be made without departing from the spirit and scope of the disclosure. In addition, although not all actions or effects according to the configurations of the embodiments have been explicitly described, it is obvious that predictable actions or effects from the configurations should also be recognized as falling within the spirit and scope of the present disclosure.

DESCRIPTION OF SYMBOLS

10: main body
12: door
14: cultivation space
20: controller
100: cultivation bed
110: cultivation container
120: handle
130: tray
132: inlet
134: water supply passage
136: water supply part
138: pressurizing protrusion
140: rail
200: shelf
210: water level sensor
212: elastic member

The invention claimed is:

1. A plant cultivating apparatus comprising:
a main body that defines a cultivation space and includes a door configured to open or close the cultivation space;
a shelf that is disposed in the cultivation space;
a water level sensor supported by the shelf;
a cultivation bed that is disposed on and supported by the shelf, that defines a receiving space, and that includes a water supply part that is recessed from a bottom surface of the cultivation bed toward the water level sensor and configured to store water; and
a cultivation container that is disposed above the water supply part of the cultivation bed,
wherein the water supply part of the cultivation bed is positioned above the water level sensor, a bottom surface of the water supply part being closer to the water level sensor than the bottom surface of the cultivation bed, and
wherein the water level sensor is configured to measure an amount of the water stored in the water supply part of the cultivation bed.

2. The plant cultivating apparatus of claim 1, wherein the bottom surface of the water supply part and the water level sensor are spaced apart from each other.

3. The plant cultivating apparatus of claim 1, further comprising:
an elastic member that is disposed between the water level sensor and the shelf and supports the water level sensor on the shelf,
wherein the elastic member is configured to bias the water level sensor against the shelf such that, based on the bottom surface of the water supply part of the cultivation bed coming into contact with the water level sensor, the water level sensor is lowered toward the shelf.

4. The plant cultivating apparatus of claim 3, wherein the bottom surface of the water supply part includes an inclined surface.

5. The plant cultivating apparatus of claim 3, wherein the bottom surface of the water supply part includes a pressurizing protrusion that protrudes downward.

6. The plant cultivating apparatus of claim 1, wherein the amount of the water stored in the water supply part is measured based on a change in capacitance of the water level sensor.

7. The plant cultivating apparatus of claim 1, wherein the cultivation bed comprises:
an inlet that is disposed on the cultivation bed and positioned higher than the water supply part, the inlet configured to introduce water to the water supply part; and
a water supply passage that extends at the receiving space of the cultivation bed and fluidly connects the inlet to the water supply part.

8. The plant cultivating apparatus of claim 1, wherein the cultivation container defines an opening that is configured to introduce the water stored in the water supply part into the cultivation container.

9. The plant cultivating apparatus of claim 8, wherein the cultivation container includes a wick that includes a porous material configured to absorb water,
wherein a lower end of the wick is disposed adjacent to the opening of the cultivation container, and
wherein the wick extends upward such that an upper end of the wick is disposed inside the cultivation container.

10. The plant cultivating apparatus of claim 1, wherein the main body includes a controller configured to control at least one of temperature, humidity, or an amount of light in the cultivation space.

11. The plant cultivating apparatus of claim 1, further comprising:
a rail configured to couple the cultivation bed to the shelf, wherein the cultivation bed is configured to slide on the shelf along the rail.

12. A plant cultivating apparatus comprising:
a main body that defines a cultivation space and includes a door configured to open or close the cultivation space;
a shelf that is disposed in the cultivation space;
a water level sensor supported by the shelf;
a cultivation bed that is disposed on and supported by the shelf, that defines a receiving space, and that includes a water supply part that is recessed from a bottom surface of the cultivation bed toward the water level sensor and configured to store water; and a cultivation container that is disposed above the water supply part of the cultivation bed, wherein a bottom surface of the water supply part is closer to the water level sensor than the bottom surface of the cultivation bed, and wherein the water level sensor is configured to measure an amount of the water stored in the water supply part of the cultivation bed, and is configured to, based on the amount of the water measured by the water level sensor being smaller than a predetermined value, allow water to be supplied to the water supply part of the cultivation bed.

13. The plant cultivating apparatus of claim 12, wherein the water level sensor is configured to operate based on the cultivation bed being disposed on the shelf.

14. The plant cultivating apparatus of claim 12, wherein the bottom surface of the water supply part and the water level sensor are spaced apart from each other.

15. The plant cultivating apparatus of claim 12, further comprising:

an elastic member that is disposed between the water level sensor and the shelf and supports the water level sensor on the shelf, wherein the elastic member is configured to bias the water level sensor against the shelf such that, based on the bottom surface of the water supply part of the cultivation bed coming into contact with the water level sensor, the water level sensor is lowered toward the shelf.

16. The plant cultivating apparatus of claim 15, wherein the bottom surface of the water supply part includes an inclined surface.

17. The plant cultivating apparatus of claim 15, wherein the bottom surface of the water supply part includes a pressurizing protrusion that protrudes downward.

18. The plant cultivating apparatus of claim 12, wherein the cultivation bed comprises:

an inlet that is disposed on the cultivation bed and positioned higher than the water supply part, the inlet configured to introduce water to the water supply part; and a water supply passage that extends at the receiving space of the cultivation bed and fluidly connects the inlet to the water supply part.

19. The plant cultivating apparatus of claim 12, wherein the cultivation container defines an opening that is configured to introduce the water stored in the water supply part into the cultivation container.

* * * * *